United States Patent [19]
Genise et al.

[11] Patent Number: 6,105,449
[45] Date of Patent: Aug. 22, 2000

[54] CONTROL FOR CONTROLLER-ASSISTED, MANUALLY SHIFTED, SYNCHRONIZED, INPUT SPLITTER-TYPE COMPOUND TRANSMISSIONS

[75] Inventors: Thomas A. Genise, Dearborn; Paul J. Mason; Thomas R. Bockelmann, both of Battle Creek, all of Mich.

[73] Assignee: Eaton Corporation, Cleveland, Ohio

[21] Appl. No.: 09/347,556

[22] Filed: Jul. 6, 1999

Related U.S. Application Data

[63] Continuation of application No. 09/148,882, Sep. 8, 1998.

[51] Int. Cl.$^7$ ................................................. B60K 41/08
[52] U.S. Cl. ........................................ 74/335; 477/124
[58] Field of Search ........................ 74/335; 477/107, 477/109, 111, 123, 124

[56] References Cited

U.S. PATENT DOCUMENTS

| | | | |
|---|---|---|---|
| 4,361,060 | 11/1982 | Smyth | 74/866 |
| 4,527,447 | 7/1985 | Richards | 74/336 |
| 4,754,665 | 7/1988 | Vandervoort | 74/745 |
| 4,850,236 | 7/1989 | Braun | 74/745 |
| 4,974,468 | 12/1990 | Reynolds | 74/477 |
| 4,989,706 | 2/1991 | Morscheck | 192/53 |
| 5,390,561 | 2/1995 | Stine | 74/331 |
| 5,435,212 | 7/1995 | Menig | 74/745 |
| 5,582,558 | 12/1996 | Palmeri | 477/109 |
| 5,651,292 | 7/1997 | Genise | 74/745 |
| 5,661,998 | 9/1997 | Genise | 74/335 |
| 5,682,790 | 11/1997 | Genise | 74/335 |
| 5,735,771 | 4/1998 | Genise | 477/111 |
| 5,737,969 | 4/1998 | Braun et al. | 74/477 |
| 5,738,195 | 4/1998 | Gluys et al. | 192/53.31 |
| 5,738,196 | 4/1998 | Gluys et al. | 192/53.331 |
| 5,743,143 | 4/1998 | Carpenter | 74/336 |
| 5,755,639 | 5/1998 | Genise et al. | 477/111 |
| 5,904,068 | 5/1999 | Genise | 74/335 |
| 5,904,635 | 5/1999 | Genise et al. | 477/111 |
| 5,974,906 | 11/1999 | Stine et al. | 74/335 |
| 5,989,155 | 11/1999 | Wadas et al. | 477/111 |
| 6,042,504 | 3/2000 | Gualtieri et al. | 477/111 |
| 6,044,721 | 5/1999 | Genise | 477/335 |

*Primary Examiner*—Khoi Q. Ta
*Attorney, Agent, or Firm*—Howard D. Gordon

[57] ABSTRACT

A control for enhanced manual shifting in a computer-assisted (48) vehicular splitter-type compound transmission (16) having a synchronized main section (16A) shifted by a manually operated shift lever (31) and a controller (42). The splitter section (16B) is located at the input end of the transmission, is provided with a three-position (L, H, N) actuator (46), and is commanded to a splitter-neutral position upon sensing an intent for a main section shift to neutral and remains in splitter neutral until the main section is reengaged to reduce the forces required to synchronize the main section.

6 Claims, 5 Drawing Sheets

CONTROL FOR CONTROLLER-ASSISTED, MANUALLY SHIFTED, SYNCHRONIZED, INPUT SPLITTER-TYPE COMPOUND TRANSMISSIONS

RELATED APPLICATIONS

This application is a continuing application of U.S. Ser. No. 09/148,882 filed Sep. 8, 1998 and titled CONTROL FOR CONTROLLER-ASSISTED, MANUALLY SHIFTED, SYNCHRONIZED, SPLITTER-TYPE COMPOUND TRANSMISSIONS, and assigned to EATON CORPORATION, assignee of this application.

This application is related to the following co-pending applications assigned to EATON CORPORATION, assignee of this application:

Ser. No. 08/822,668 filed Mar. 24, 1997 and titled SEMI-AUTOMATIC SHIFT IMPLEMENTATION WITH SYNCHRONIZED TRANSMISSION Ser. No. 08/917,301 filed Aug. 25, 1997 and titled INTENT-TO-SHIFT SEMI-AUTOMATIC SHIFT IMPLEMENTATION Ser. No. 09/053,090 filed Apr. 1, 1998 and titled ADAPTIVE NEUTRAL SENSING Ser. No. 09/053,091 filed Apr. 1, 1998 and titled JAW CLUTCH ENGAGEMENT CONTROL FOR ASSISTED, MANUALLY SHIFTED, SPLITTER-TYPE TRANSMISSION SYSTEM Ser. No. 09/053,092 filed Apr. 4, 1998 and titled ENGINE FUEL CONTROL FOR COMPLETING SHIFTS IN CONTROLLER-ASSISTED, MANUALLY SHIFTED TRANSMISSIONS Ser. No. 09/053,181 filed Apr. 1, 1998 and titled ADAPTIVE SPLITTER ACTUATOR ENGAGEMENT FORCE CONTROL Ser. No. 09/148,873 filed Sep. 8, 1998 and titled CONTROL FOR CONTROLLER-ASSISTED, MANUALLY SHIFTED, SPLITTER-TYPE COMPOUND TRANSMISSIONS Ser. No. 09/148,882 filed Sep. 8, 1998 and titled CONTROL FOR CONTROLLER-ASSISTED, MANUALLY SHIFTED, SYNCHRONIZED, SPLITTER-TYPE COMPOUND TRANSMISSIONS Ser. No. 09/294,118 filed Apr. 14, 1999 and titled ASSISTED, LEVER-SHIFTED MECHANICAL TRANSMISSION SYSTEM Ser. No. 09/347556 filed Jul. 6, 1999 [98-rTRN-351-CON] and titled CONTROL FOR CONTROLLER ASSISTED, MANUALLY SHIFTED, SYNCHRONIZED, SPLITTER-TYPE COMPOUND TRANSMISSIONS

BACKGROUND OF THE INVENTION

1. Field of the Invention

The present invention relates to a controller-assisted, manually shifted, synchronized vehicular transmission system including a splitter-type compound transmission having an input splitter. The system will sense an intent to shift the main section, which includes a shift into main section neutral, and will automatically control engine fueling to minimize driveline torque and shift the splitter section into neutral, allowing the synchronized main section to be easily disengaged and then easily engaged into a target ratio with relatively lower synchronizer force and, thus, relatively lower driver effort. Upon sensing completion of the main section shift into a main section target ratio, the splitter section will be caused to engage in an appropriate splitter ratio.

More particularly, in a preferred embodiment of the present invention, a splitter or combined splitter-and-range-type compound synchronized transmission of the input splitter type for heavy-duty vehicles is provided with controls and actuators for manually performed dynamic forward main section shifting without requiring excessive force to be applied by the operator to the synchronizers. In a preferred embodiment, main section shifts are performed, without requiring manual throttle or master clutch manipulation, by relatively low-force lever shifting with automatic engine control to cause torque breaks for shifting into neutral and to synchronize for engaging the splitter to complete a shift into the target gear ratio.

2. Description of the Prior Art

Compound manually shifted mechanical transmissions of the range, splitter and/or combined range/splitter type are in wide use in heavy-duty vehicles and are well known in the prior art, as may be seen by reference to U.S. Pat. Nos. 4,754,665; 5,272,929; 5,370,013 and 5,390,561, 5,546,823; 5,609,062 and 5,642,643, the disclosures of which are incorporated herein by reference. Typically, such transmissions include a main section shifted directly or remotely by a manual shift lever and one or more auxiliary sections connected in series therewith. The auxiliary sections most often were shifted by a slave actuator, usually pneumatically, hydraulically, mechanically and/or electrically operated, in response to manual operation of one or more master switches. Shift controls for such systems by be seen by reference to U.S. Pat. Nos. 4,455,883; 4,550,627; 4,899,607; 4,920,815; 4,974,468; 5,000,060; 5,272,931; 5,281,902; 5,222,404; 5,350,561 and 5,737,696, the disclosures of which are incorporated herein by reference.

Three-position splitter actuators and transmission systems utilizing same are disclosed in U.S. Pat. Nos. 5,651,292 and 5,661,998, the disclosures of which are incorporated herein by reference.

Fully or partially automated transmission systems wherein a microprocessor-based electronic control unit (ECU) receives input signals indicative of various system operating conditions and processes same according to logic rules to issue command output signals to one or more system actuators are known in the prior art, as may be seen by reference to U.S. Pat. Nos. 4,361,060; 4,593,580; 4,595,986; 4,850,236; 5,435,212; 5,582,069; 5,582,558; 5,620,392; 5,651,292; 5,679,096; 5,682,790 and 5,735,771; the disclosures of which are incorporated herein by reference.

Synchronized transmissions and/or transmission sections and synchronized jaw clutch assemblies therefor are known in the prior art, as may be seen by reference to U.S. Pat. Nos. 4,989,706; 5,738,195 and 5,738,196, the disclosures of which are incorporated herein by reference.

U.S. Pat. No. 4,527,446, the disclosure of which is incorporated herein by reference, discloses a fully automated, blocked-type transmission wherein the main section is automatically shifted to main section neutral during each shift.

Prior art synchronized transmissions for medium- and heavy-duty vehicles were not totally satisfactory, as excessive force was required to operate the synchonizers, the synchronized jaw clutch assemblies tended to be large, expensive and/or complicated and expensive, the synchronizers tended to experience excessive wear, and/or complicated and expensive shift-assist mechanisms were required.

SUMMARY OF THE INVENTION

A preferred embodiment of the present invention involves a computer-assisted mechanical compound transmission system using a "2×4×2" type transmission of the type seen in U.S. Pat. No. 5,390,561, wherein the synchronized main section is shifted by a manually controlled shift lever and the engine is fueled and the auxiliary sections are shifted by actuators at least partially controlled by an ECU to enhance shifting. The ECU uses sensed and/or calculated inputs indicative of system operating parameters, such as operation of a splitter switch and/or a range switch, position and/or rate of change of position of the shift lever, engaged gear ratio, engine speed, output shaft speed, clutch condition and/or throttle pedal position, to determine a target gear ratio and assist shifting by controlling the three-position splitter actuator shift actuator, engine fueling and/or operation of the range shift actuator.

In accordance with the present invention, the drawbacks of the prior art are minimized or overcome by the provision of a control method/system that includes logic rules or an algorithm using inputs to determine when a manual shift into the main transmission section neutral is intended and to automatically cause the engine to be fueled to minimize torque and the input splitter section to be shifted into splitter section neutral. This will allow the main transmission section to be easily shifted into neutral. When the main section is then shifted into neutral for engaging a new main section ratio, retaining the splitter in neutral will reduce the inertia of the rotating elements being controlled by the main section synchronizer friction members, allowing the main section to be synchronized with a significantly reduced torque. This will disconnect at least the clutch and input shaft inertia from the main shaft gears, as compared to merely disengaging the master clutch, reducing the amount of effort by the vehicle operator. Preferably, the splitter will utilize a non-synchronized jaw clutch and upon sensing engagement of a target main section ratio, fueling of the engine will be controlled to synchronize the engine for engaging the appropriate splitter ratio.

Accordingly, it is an object of the present invention to provide ECU assistance for enhanced shifting of a synchronized mechanical compound splitter-type transmission having a synchronized main section shifted by a manually operated shift lever.

This and other objects and advantages of the present invention will become apparent from a reading of the following description of the preferred embodiment taken in connection with the attached drawings.

DESCRIPTION OF THE PREFERRED EMBODIMENT

Figure 1:
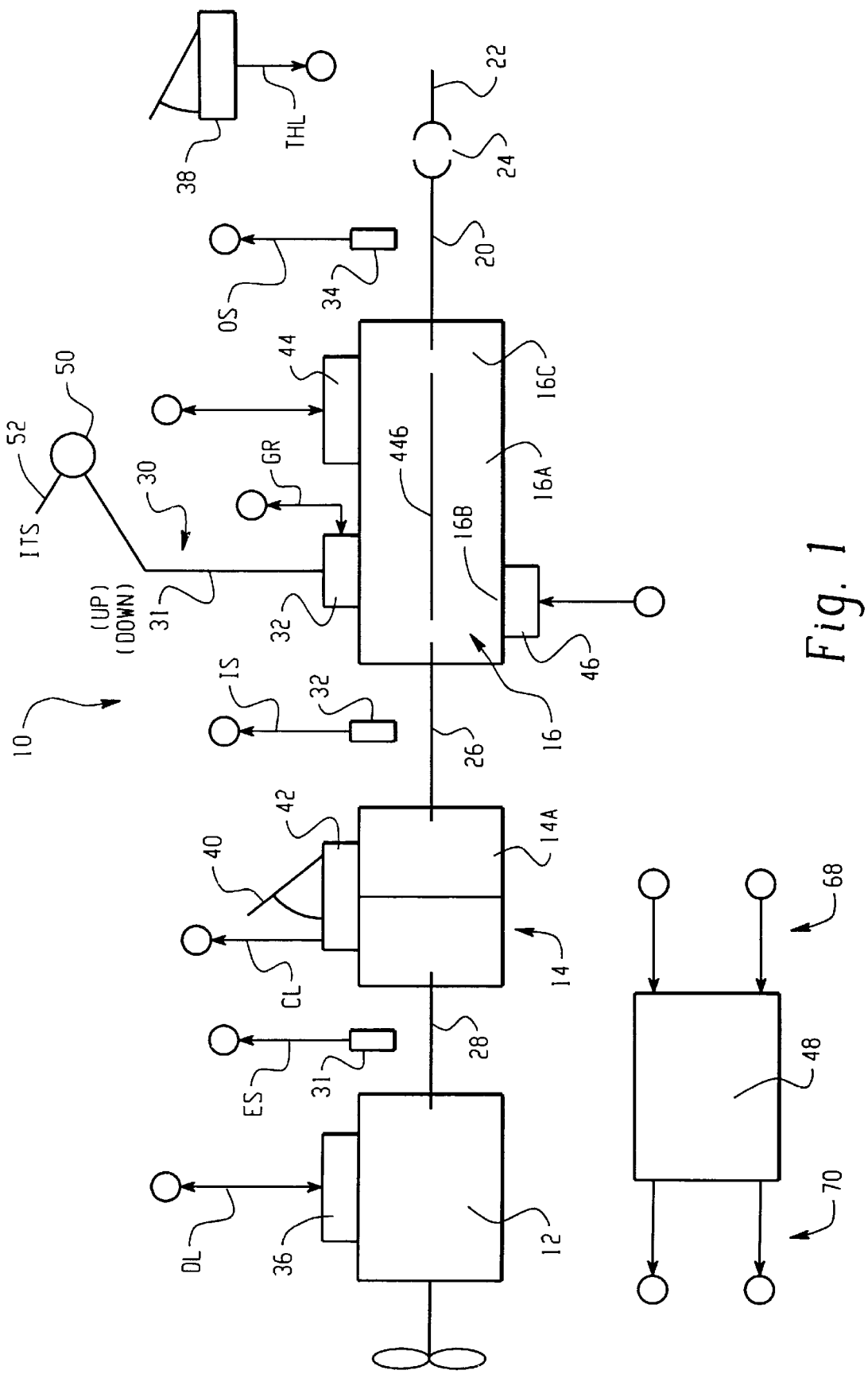
FIG. 1 is a schematic illustration of an ECU-assisted, synchronized compound input splitter-type mechanical transmission system advantageously utilizing the control techniques of the present invention.
Figure 2A:
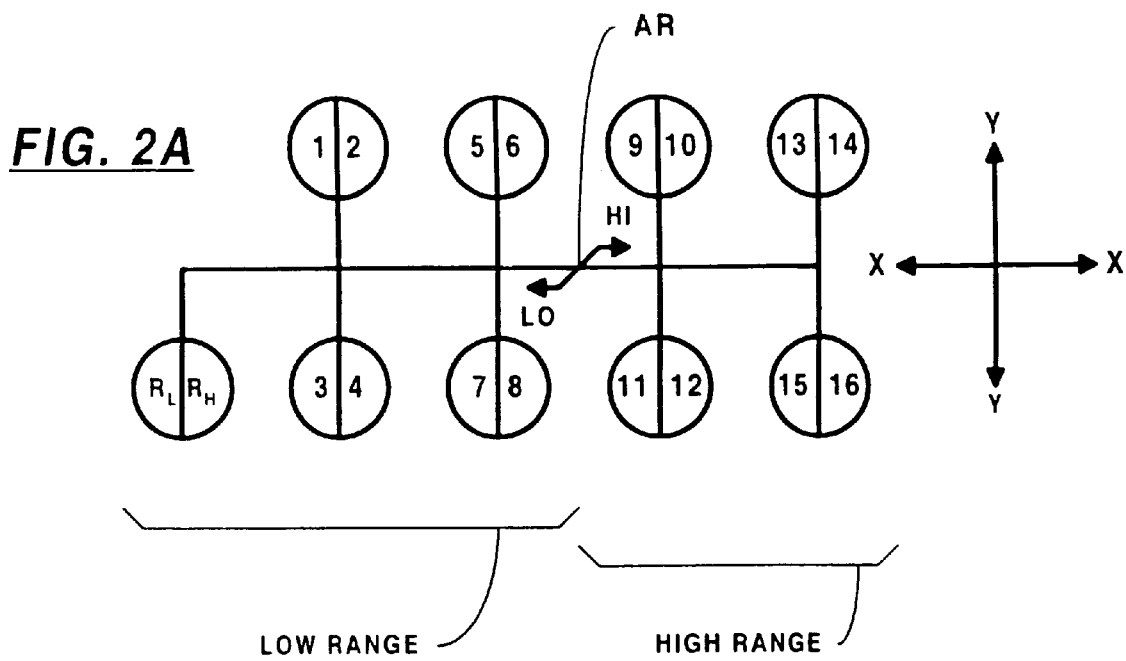
FIGS. 2A and 2B are charts illustrating the shift patterns for the transmission of FIG. 1.
Figure 2B:
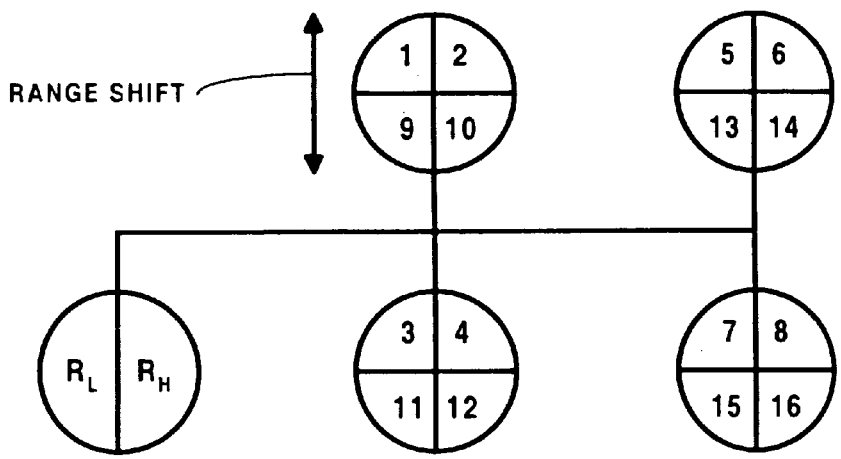
Figure 3:
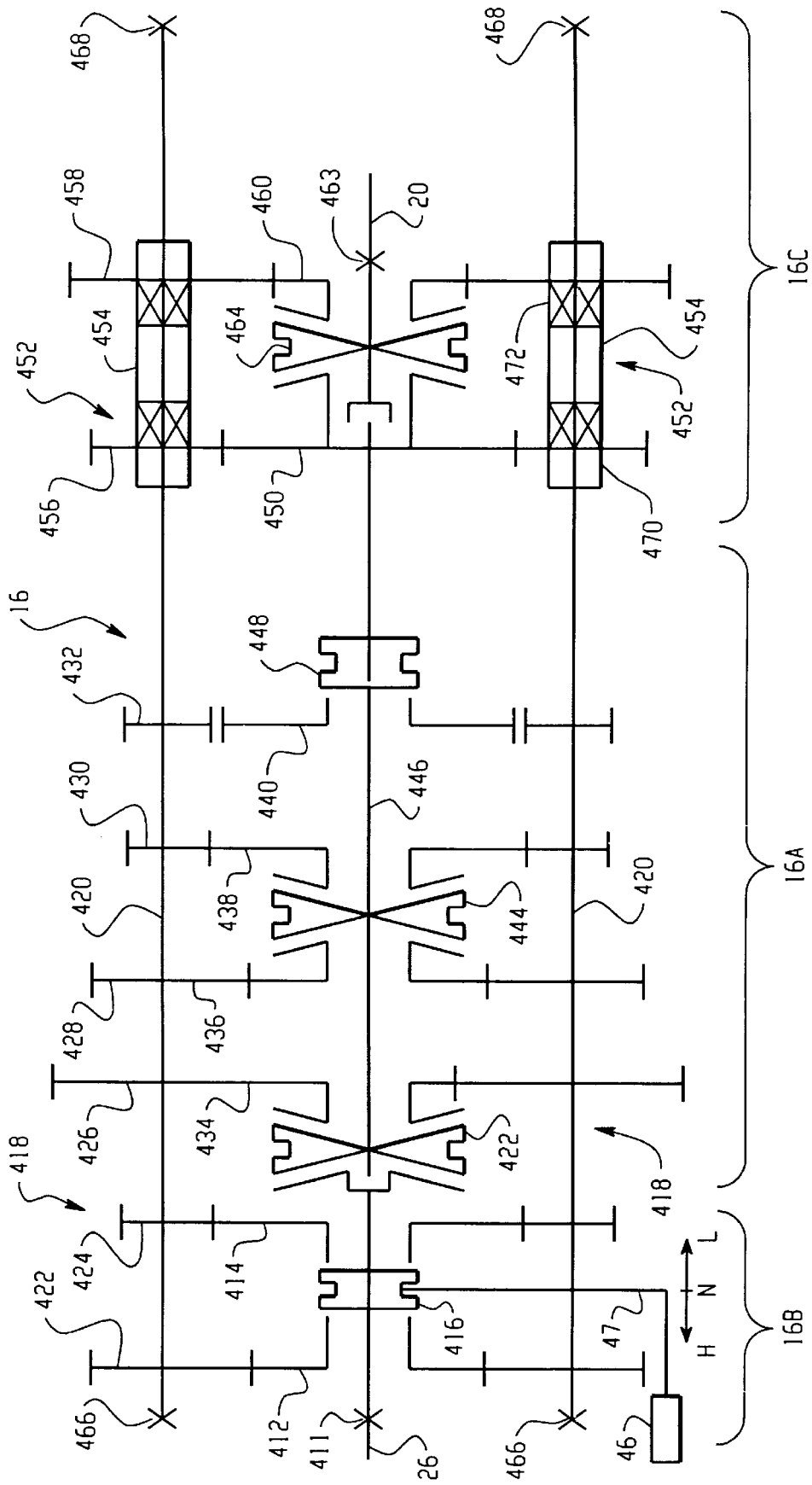
FIG. 3 is a schematic illustration of the structure of the compound input splitter-type mechanical transmission of FIG. 1.
Figure 4A:
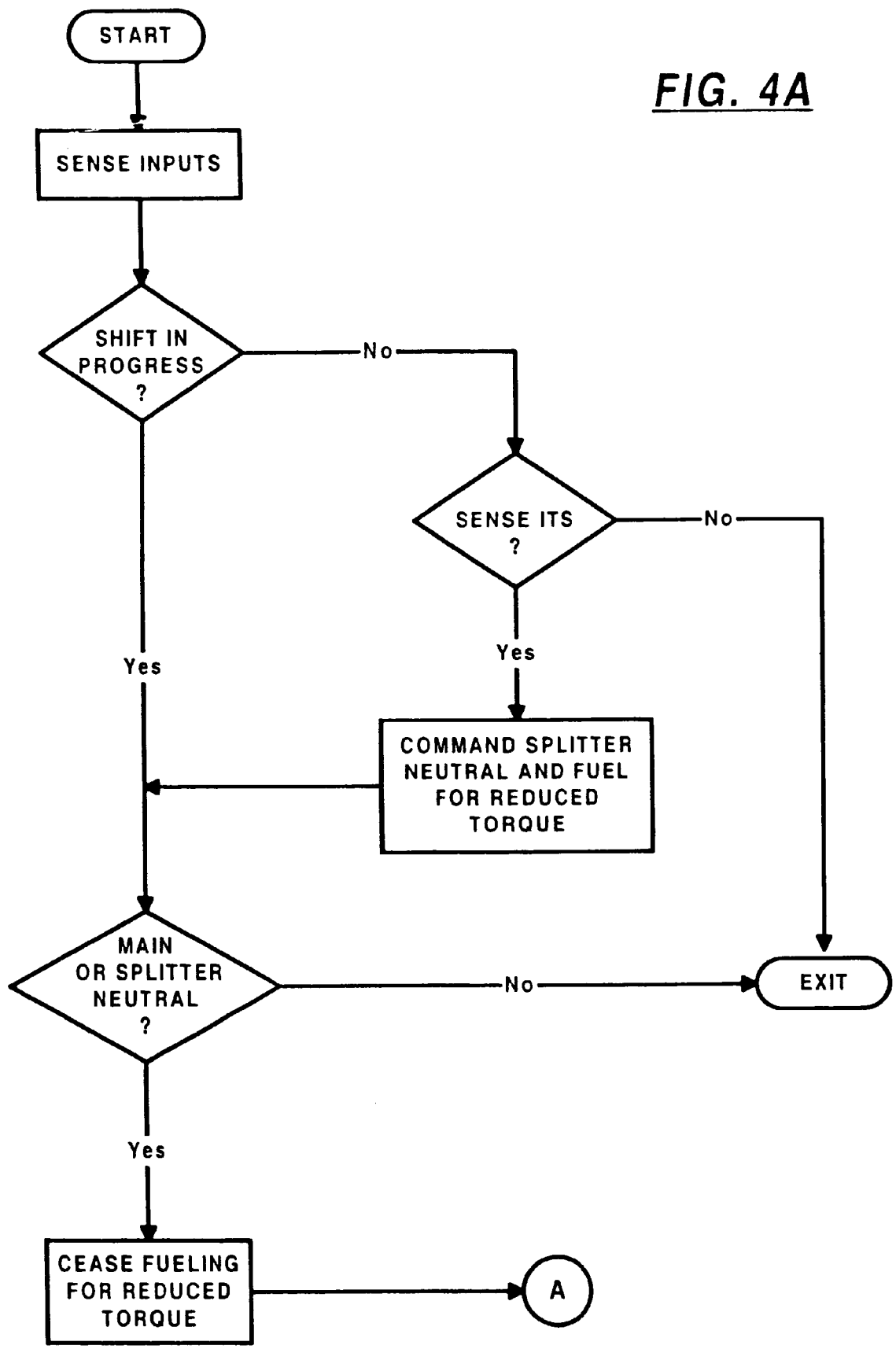
FIGS. 4A and 4B are schematic illustrations, in flow chart format, of the control of the present invention.
Figure 4B:
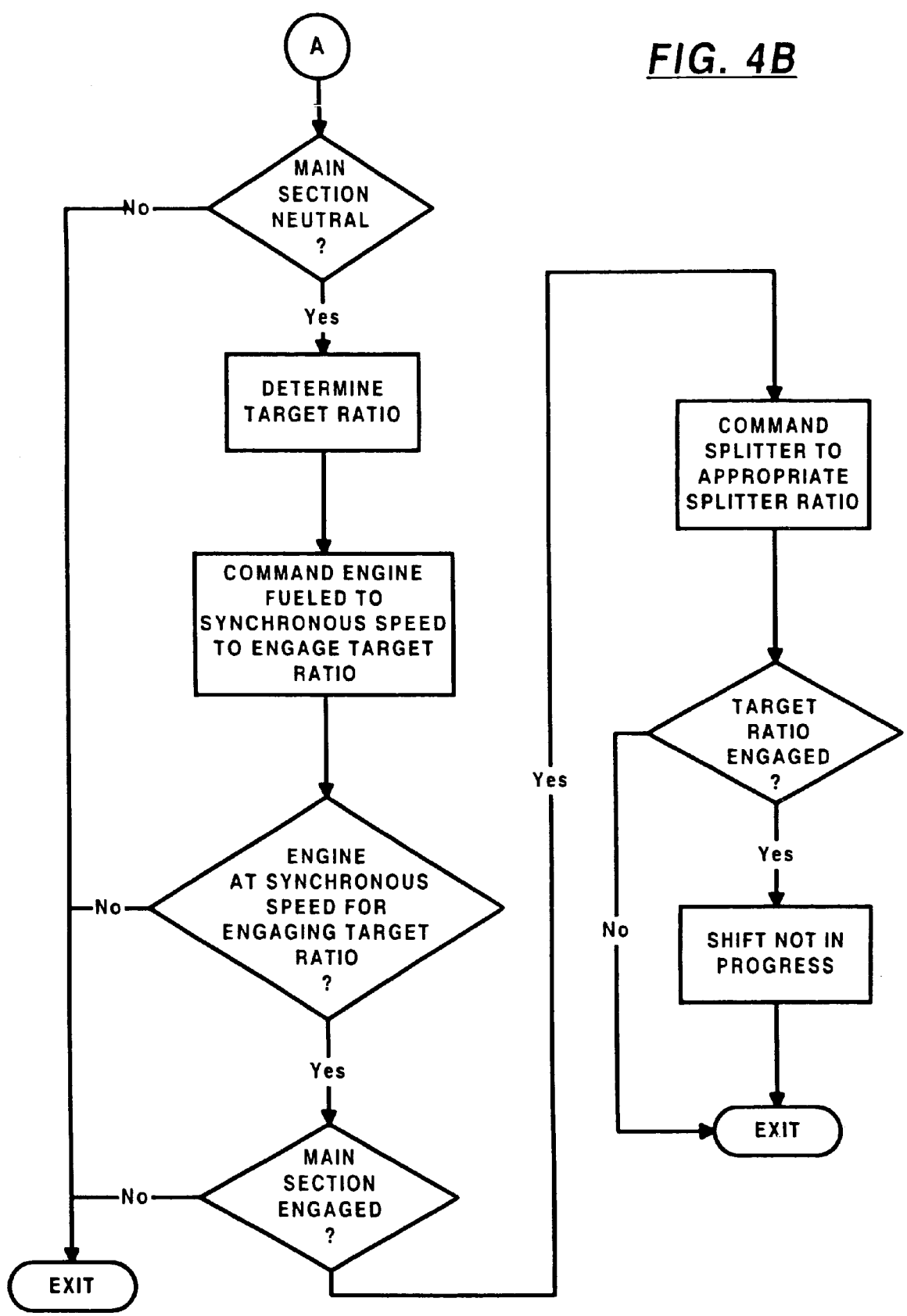

A computer-assisted (i.e., microprocessor-based, controller-assisted) vehicular compound mechanical transmission system 10, particularly well suited to utilize the shift control of the present invention, may be seen by reference to FIGS. 1–3. The operation of the system is illustrated in flow chart format in FIGS. 4A and 4B.

System 10 is of the type commonly utilized in heavy-duty vehicles, such as the conventional tractors of tractor/semi-trailer vehicles, and includes an engine, typically a diesel engine 12, a master friction clutch 14 contained within a clutch housing, a multiple-speed compound transmission 16 of the "2×4×2" input splitter type, and a drive axle assembly (not shown). The transmission 16 includes an output shaft 20 drivingly coupled to a vehicle drive shaft 22 by a universal joint 24 for driving the drive axle assembly and an input shaft 26 coupled to the engine by clutch 14. The transmission 16 is housed within a transmission housing to which is directly mounted the shift tower of the shift lever assembly 30. The present system is equally applicable to remotely mounted shift levers, as are used in cab-over-engine types of vehicles.

FIG. 2A illustrates a "double-H" shift pattern for assisted manual shifting of a combined range-and-splitter-type compound transmission shifted by a manually operated shift lever. Briefly, the shift lever 31 is movable in the side-to-side or X—X direction to select a particular ratio or ratios to be engaged and is movable in the fore and aft or Y—Y direction to selectively engage and disengage the various ratios. The shift pattern may include an automatic range shifting feature and automatically selected and/or implemented splitter shifting, as is known in the prior art. With automatic range and splitter shifting, the transmission will be manually shifted in a manner similar to that of an 8-speed transmission. Manual transmissions utilizing shift mechanisms and shift patterns of this type are well known in the prior art and may be appreciated in greater detail by reference to aforementioned U.S. Pat. Nos. 5,000,060 and 5,390,561.

Typically, the shift lever assembly 30 will include a shift finger or the like (not shown) extending downwardly into a shifting mechanism 32, such as a multiple-rail shift bar housing assembly or a single shift shaft assembly, as is well known in the prior art and as is illustrated in aforementioned U.S. Pat. Nos. 4,455,883; 4,550,627; 4,920,815 and 5,272,931.

In the automatic range shifting feature, as the shift lever moves in the transition area of the shift pattern, it will cross a point, AR, which will actuate a mechanical or electrical range switch, or will be sensed by a position sensor, to cause automatic implementation of a range shift. FIG. 2B illustrates a comparable "repeat-H" type shift pattern.

Shifting of transmission 16, comprising synchronized main section 16A coupled in series to splitter input section 16B and range output section 16C, is semi-automatically implemented/assisted by the vehicular transmission system 10, illustrated in FIGS. 1–3. Main section 16A includes an input shaft 26, which is operatively coupled to the drive or crank shaft 28 of the vehicle engine 12 by master clutch 14, and output shaft 20 of auxiliary range section 16C is operatively coupled, commonly by means of a drive shaft 24, to the drive wheels of the vehicle. The auxiliary input section 16B is a splitter type.

The change-gear ratios available from main transmission section 16 are manually selectable by manually positioning the shift lever 31 according to the shift pattern prescribed to engage the particular desired change-gear ratio of main section 16A.

The system may include sensors 30 (for sensing engine rotational speed (ES)), 32 (for sensing input shaft rotational speed (IS)), and 34 (for sensing output shaft rotational speed (OS)), and providing signals indicative thereof. As is known, with the clutch 14 (i.e., no slip) engaged and the transmission engaged in a known gear ratio, ES=IS=OS*GR (see U.S. Pat. No. 4,361,060). Accordingly, if clutch 14 is engaged, engine speed and input shaft speed may be considered as equal. Input shaft speed sensor 32 may be eliminated and engine speed (ES), as sensed by a sensor or over a data link (DL), substituted therefor.

Engine 12 is electronically controlled, including an electronic controller 36 communicating over an electronic data link (DL) operating under an industry standard protocol such as SAE J-1922, SAE J-1939, ISO 11898 or the like. Throttle position (operator demand) is a desirable parameter for selecting shifting points and in other control logic. A separate throttle position sensor 38 may be provided or throttle position (THL) may be sensed from the data link. Gross engine torque (TEG) and base engine friction torque (TBEF) also are available on the data link.

A manual clutch pedal 40 controls the master clutch 14, and a sensor 42 provides a signal (CL) indicative of clutch-engaged or -disengaged condition. The condition of the clutch also may be determined by comparing engine speed to input shaft speed if both signals are available. An auxiliary section actuator 44 including a range shift actuator and a splitter actuator 46 is provided for operating the range clutch and the splitter section clutch in accordance with command output signals from ECU 48. The shift lever 31 has a knob 50 which contains selector switch 52 by which a driver's intent to initiate a compound shift may be sensed. The switch 52 may simply indicate an intent to shift or also the intended direction of the shift. See aforementioned U.S. Pat. No. 5,582,558.

System 10 may include a driver's display unit including a representation of the shift pattern with individually lightable display elements representing each of the selectable engagement positions.

The system includes a control unit or ECU 48, preferably a microprocessor-based control unit of the type illustrated in U.S. Pat. Nos. 4,595,986; 4,361,065 and 5,335,566, the disclosures of which are incorporated herein by reference, for receiving input signals 68 and processing same according to predetermined logic rules to issue command output signals 70 to system actuators, such as the splitter section actuator 46, the engine controller 36, the range shift actuator and/or the display unit 54. A separate system controller may be utilized, or the engine controller ECU 36 communicating over an electronic data link may be utilized.

As shown in aforementioned U.S. Pat. No. 5,651,292 and 5,661,998, the splitter actuator 46 is, preferably, a three-position device, allowing a selectable and maintainable splitter section neutral. Alternatively, a "pseudo" splitter-neutral may be provided by deenergizing the splitter actuator when the splitter clutch is in an intermediate, non-engaged position.

The structure of the 10-forward-speed combined range-and-splitter-type synchronized transmission 16 is schematically illustrated in FIG. 3. Transmissions of this general type are disclosed in aforementioned U.S. Pat. Nos. 5,370,013 and 5,390,561.

Transmission 16 is a "2×4'2" type 16-speed transmission having a two-speed splitter section 16B, a four forward-speed main section 16A, and a two-speed range section 16C, all connected in series.

Briefly, an input shaft 26 is supported in the transmission housing forward wall (not shown) by bearing 411 and is surrounded by two input gears 412 and 414, a selected one of which is clutched to the input shaft by non-synchronized clutch 416 to provide a two-speed splitter input section. Front countershaft assemblies 418 each include a countershaft 420 carrying countershaft gears 422, 424, 426, 428, 430 and 432. Gears 422 and 424 are contantly meshed with the input gears 412 and 414. In main section 416, gears 426, 428, 430 and 432 are constantly meshed with main shaft gears 434, 436, 438 and a reverse idler (not shown) meshed with reverse main shaft gear 440. Double-acting synchronized clutches 442 and 444 are provided on main shaft 446 to clutch the main shaft 446 to a selected one of the input shaft 410 or main shaft gears 434, 436 or 438. Non-synchronized clutch 448 is used to clutch the reverse main shaft gear 440 to the main shaft 446.

The rearward end of main shaft 446 extends into the two-speed range section 408 and carries gear 450 fixed for rotation therewith. A pair of auxiliary section countershaft assemblies 452 each include an auxiliary section countershaft 454 carrying two auxiliary section countershaft gears 456 and 458. Gear 456 is constantly meshed with auxiliary input gear 450, while gear 458 is constantly meshed with an output gear 460 surrounding output shaft 462. Output shaft 462 is supported in the housing rear end wall (not shown) by bearing(s) 463. A two-position synchronized range clutch 464 is carried by the output shaft 20 and is utilized to clutch either output gear 460 or main shaft 446 to the output shaft 462.

Bearings 466 and 468 are used to rotatably mount the front countershafts 420 to the forward and rearward end walls (not shown) of a transmission housing. Auxiliary countershafts 254 are generally tubular members telescopically surrounding the rear ends of the front countershafts and may be supported thereon by needle bearings 470 and 472 or the like. The main shaft is supported by the input shaft and/or output shaft.

The splitter jaw clutch 416 is a double-sided, non-synchronized clutch assembly which may be selectively positioned in the rightwardmost or leftwardmost positions for engaging either gear 414 or gear 412, respectively, to the input shaft 26 or to an intermediate position wherein neither gear 414 or 412 is clutched to the input shaft. Splitter jaw clutch 416 is axially positioned by means of a shift fork 47 controlled by the three-position splitter actuator 46, such as a piston actuator, as is known in the prior art and to control signals from ECU 48 (see U.S. Pat. No. 5,661,998). Two-position synchronized range clutch assembly 464 is a two-position clutch which may be selectively positioned in either the rightwardmost or leftwardmost positions thereof for selectively clutching either gear 400 or 450, respectively, to output shaft 20. Clutch assembly 464 is positioned by means of a shift fork (not shown) operated by means of a two-position piston device. Either piston actuator may be replaced by a functionally equivalent actuator, such as a ball screw mechanism, ball ramp mechanism or the like.

Splitter shifting of transmission 16 is preferably automated (see U.S. Pat. No. 5,435,212). Range shift devices of this general type are known in the prior art and may be seen by reference to aforementioned U.S. Pat. Nos. 3,429,202; 4,455,883; 4,561,325 and 4,663,725.

The shift knob 50 includes a sensor or an intent-to-shift button 52 by which the driver will indicate that he intends to initiate a lever shift sequence. Upon receiving the intent-to-shift signal, the controller will issue commands to the engine controller 36 to relieve torque lock by fuel manipulations and to the splitter section actuator 46 to preselect a shift into splitter neutral. This will allow easy shifting from the engaged ratio into neutral without operator throttle manipulation or clutch disengagement. Engine manipulations to relieve torque lock without requiring clutch disengagement is described in greater detail in aforementioned U.S. Pat. Nos. 4,850,236 and 5,105,357.

Although the present invention is illustrated in the embodiment of a compound transmission not having an intermediate wall, the present invention is equally applicable to transmissions of the type illustrated in aforementioned U.S. Pat. Nos. 4,754,665; 5,193,410 and 5,368,145.

According to the illustrated embodiment of the present invention, and as more fully described in aforementioned U.S. Pat. No. 5,651,292, the interengaging clutch teeth provided on splitter clutch 416 and on splitter gears 412 and 414 are preferably of a relatively large backlash (i.e., about 0.020–0.060 inches for a 3.6-inch pitch diameter clutch), which will assure that almost any attempted splitter shift under full force will be completed.

Actuator 46 may be a conventional three-position actuator (see U.S. Pat. No. 5,054,591, the disclosure of which is incorporated herein by reference) or an actuator of the type illustrated in U.S. Pat. No. 5,682,790 or 5,661,998 (the disclosures of which are incorporated herein by reference), wherein pulse width modulation of a selectively pressurized and exhausted chambers may be used to achieve the three splitter positions (L, N, H) of the shift fork 47.

Preferably, the splitter clutch actuator 46 will be capable of applying a variable force, such as by pulse width modulation, of supply pressure. A force lesser than full force may be utilized when disengaging and/or when synchronous conditions cannot be verified.

In a preferred embodiment, the controller 48 is provided with logic rules under which, if the main section is engaged, a shift from splitter neutral into a selected target splitter ratio is initiated such that, under normal conditions, the synchronous error (which is equal to input shaft rotational speed minus the product of output shaft rotational speed and transmission target gear ratio) is expected to be equal to or less than a value selected to give smooth, high-quality shifts ((IS—(OS*GR))=ERROR≦REF). The timing is done in regard to sensed/expected shaft speeds, shaft acceleration/deceleration and actuator reaction times.

In certain situations, the logic rules will recognize operating conditions wherein the preferred synchronous window (i.e., IS=(OS*GR)±60 RPM) must be expanded to accomplish a splitter shift, even at the expense of shift quality. These situations, usually associated with upshifts, include if shifting attempted at low engine speeds wherein expected engine speed at shift completion will be undesirably low, if deceleration of the output shaft is relatively high (dOS/dt<REF), if the deceleration of the engine is relatively low (dES/dt>REF) and/or if the absolute value of the synchronous error is not approaching the normal value at an acceptable rate.

The position of the shift lever 31 or of the shifting mechanism 32 controlled thereby may be sensed by a position sensor device. Various positioning sensing assemblies are known in the prior art, with a preferred type illustrated in U.S. Pat. No. 5,743,143, assigned to the assignee of this application, the disclosure of which is incorporated herein by reference.

The sensor will provide a signal GR indicative of the position of shift lever 31 relative to the shift pattern illustrated in FIG. 2. Preferably, the rate of change of position (dGR/dt) also may be determined and utilized to enhance shifting of the system 10.

By way of example, referring to FIG. 2A, if shift lever position can be sensed, the need for a fixed switch or the like at point AR to sense a required initiation of a shift between low range and high range is eliminated. Further, as physical switches are no longer required, the shift pattern position at which a range shift will be commanded can be varied to enhance system performance under various operating conditions.

The state of engagement (i.e., engaged or neutral) of the main transmission section 16A is an important control parameter for system 10. By way of example, according to the shift logic of the present invention, if main section neutral is sensed, the splitter clutch 416 is preferably commanded to its neutral position. Also, if the main section is engaged while the splitter is in neutral, the system will initiate automatic fuel control and not cause splitter engagement until substantial synchronous is sensed. Of course, it is important to prevent or minimize false determinations of main section neutral and/or engaged conditions.

In the illustrated transmission system 10, the system controller 48 can determine the identity of the target gear ratio (GRT) from the shift shaft position sensor 160 and the position of the splitter. The controller then determines if the main section or the splitter is engaged (assuming not a range shift) and what engine speed is needed to complete engagement of the target ratio (GRT) by engaging the splitter under current vehicle speed (as represented by output shaft speed OS). Upon completion of the shift, a throttle recovery technique (see U.S. Pat. No. 4,493,228) will be used to return control of fueling to the driver/operator.

According to the shift control of the present invention, whenever a shift in the main transmission section 16A is undertaken by shifting the main section to neutral, or an intent to shift into main section neutral is sensed, the controller 48 will cause the splitter section 16B to be shifted to splitter neutral. This will disconnect the main shaft gears 434, 436 and 438 from the inertia of the engine 12 and the clutch 14. This is a considerably lower inertia than is achieved by simply disengaging the master clutch 14, as the inertia of the master clutch output members 14A and the input shaft is also disconnected from the main shaft gearing. This will result in a quicker and lower effort main section shift while eliminating the need to manipulate the master clutch during dynamic shifting. This allows the main section to be engaged with only relatively little force exerted by the operator on the shift lever 31, eliminates the need for shift-assist mechanisms.

Even compared to a disengaged master clutch, if the splitter did not disconnect the main shaft 446 from the vehicle load, the synchronizers would be required to overcome the inertia of the input shaft and certain master clutch components, which would increase were the clutch not in proper adjustment.

Upon sensing engagement of the main section in a selected ratio, the controller 48 will cause the engine to achieve a synchronous speed for engaging the target ratio and will then cause the splitter section 16B to be engaged in the appropriate splitter ratio. The appropriate ratio may be determined by shaft speeds, sensed shift lever position and/or by signals from switch 52 which may provide up/down and/or splitter-high/splitter-low shift signals. Upon engagement of the target ratio, or upon sensing disengagement of the master clutch, fueling is returned to operator control.

Accordingly, it may be seen that a new and improved shift control for an assisted, synchronized, compound input splitter-type mechanical transmission which will reduce the force necessary to synchronize transmission main section shifts is provided.

Although the present invention has been described with a certain degree of particularity, it is understood that the description of the preferred embodiment is by way of example only and that numerous changes to form and detail are possible without departing from the spirit and scope of the invention as hereinafter claimed.

We claim:

1. A compound vehicular transmission system (10) comprising:
   a compound splitter-type mechanical transmission (16) having an input shaft coupled (26) to a fuel-controlled engine (12) and an output shaft (20), said transmission having a shift-lever-shifted, synchronized main transmission section (16A) connected in series with a splitter-type auxiliary section (16B), said splitter-type auxiliary transmission section (16B) interposed between said main transmission section (16A) and said engine;
   a fuel controller (36) for controlling fueling of the engine;
   a device (52) for sensing an operator intent to shift and providing a signal indicative thereof;
   a splitter actuator (46) for selectively causing said splitter section to be shifted into a selected one of a first splitter ratio (low), a second splitter ratio (high), or a splitter-neutral (N) position, and
   a controller (48, 36) for receiving input signals (68) and processing same according to logic rules to issue command output signals (70) to system actuators including said fuel controller and said splitter section actuator, said logic rules including rules for determining an engaged or neutral position of said main transmission section and of said auxiliary transmission section, and effective
      (a) to determine a target ratio;
      (b) upon sensing an intent to shift, to command (i) said engine to be fueled to minimize torque between said input and output shafts and (ii) said auxiliary section to be shifted to neutral;
      (c) upon sensing that either said main or said auxiliary section is in neutral, to cease commanding said engine to be fueled to minimize torque between said input and output shafts;
      (d) then, upon sensing said main transmission section in a neutral position, commanding said engine to be fueled to achieve a substantially synchronous speed for engaging said target ratio; and
      (e) after sensing engagement of said main transmission section, causing engagement of said auxiliary section.

2. The system of claim 1 wherein said logic rules are effective to determine a target ratio prior to sensing said main transmission section is in neutral.

3. The system of claim 1 wherein said system includes a sensor (32) for providing a signal (GR) indicative of the position of said shift lever (31) in a shift pattern and said target ratio is determined after sensing said main transmission in neutral as a function of said position.

4. The system of claim 1 further comprising a range-type section (16F), said splitter section (16B) interposed said main transmission section (16A) and said range-type section (16F).

5. A method for controlling shifting in a compound vehicular transmission system (10) comprising a compound splitter-type mechanical transmission (16) having an input shaft coupled to a fuel-controlled engine (12) and an output shaft, said transmission having a shift-lever-shifted, synchronized main transmission section (16A) connected in series with a splitter-type auxiliary section, said auxiliary transmission section (16B) interposed between said main transmission section (16A) and said engine, a splitter actuator (46) for selectively causing said splitter section to be shifted into a selected one of a first splitter ratio (low), a second splitter ratio (high), or a splitter-neutral (N) position, a controller (48, 36) for receiving input signals (68) and processing same according to logic rules to determine (i) an intent to shift the transmission, (ii) the engaged or neutral positions of said main and splitter transmission sections, and (iii) a target gear ratio and to issue command output signals (70) to system actuators including an engine fuel controller and said splitter section actuator, said method comprising:
   (a) upon sensing an intent to shift, commanding (i) said engine to be fueled to minimize torque between said input and output shafts and (ii) said splitter section to be shifted to neutral;
   (b) upon sensing that either said main or said splitter section is in neutral, ceasing commanding said engine to be fueled to minimize torque between said input and output shafts;
   (c) then, upon sensing said main transmission section in a neutral position, commanding said engine to be fueled to achieve a substantially synchronous speed for engaging said target ratio; and
   (d) upon sensing engagement of said main transmission section, causing engagement of said splitter section; and
   (e) upon sensing engagement of said target ratio, causing said engine to be fueled in accordance with operator requests.

6. The method of claim 5 wherein step (d) also requires sensing said engine rotating at a substantially synchronous speed for engaging said target ratio.

* * * * *